United States Patent [19]
Wagner

[11] Patent Number: 5,517,577
[45] Date of Patent: May 14, 1996

[54] SELF ALIGNING, LOW POWER CHARACTER READING APPARATUS

[75] Inventor: Gregg A. Wagner, Boulder, Colo.

[73] Assignee: Soricon Corporation, Boulder, Colo.

[21] Appl. No.: 201,763

[22] Filed: Feb. 25, 1994

[51] Int. Cl.$^6$ ............................................. G06K 9/00
[52] U.S. Cl. ........................ 382/135; 382/182; 382/320;
  271/226; 271/250; 271/251; 235/483; 235/485;
  360/71; 360/72.3; 347/30
[58] Field of Search ...................... 382/7, 11, 64,
  382/135, 182, 230; 271/251, 143, 226,
  241, 250; 235/61.11 E, 483, 485, 443; 360/71,
  72.3; 347/30

[56] References Cited

U.S. PATENT DOCUMENTS

| | | | |
|---|---|---|---|
| 3,187,891 | 6/1965 | Chichester et al. | 382/7 |
| 3,391,387 | 7/1968 | Flores | 382/7 |
| 3,558,860 | 1/1971 | Bauldreay et al. | 235/476 |
| 3,571,793 | 3/1971 | Britt | 382/7 |
| 3,627,990 | 12/1971 | Sallach | 235/458 |
| 3,796,861 | 3/1974 | Hirata et al. | 235/474 |
| 3,818,446 | 6/1974 | Benson | 382/7 |
| 3,831,009 | 8/1974 | McMillin | 235/474 |
| 3,898,432 | 8/1975 | Agnew et al. | 271/250 |
| 3,916,156 | 10/1975 | Pass et al. | 235/443 |
| 3,939,327 | 2/1976 | Humphrey | 235/61.11 E |
| 3,947,022 | 3/1976 | Kockler | 271/250 |
| 3,964,739 | 6/1976 | Garcia | 271/250 |
| 4,087,789 | 5/1978 | Beery | 382/64 |
| 4,112,470 | 9/1978 | Yamauchi | 235/483 |
| 4,143,355 | 3/1979 | MacIntyre | 382/7 |
| 4,384,197 | 5/1983 | Kawakami | 235/483 |
| 4,438,917 | 3/1984 | Janssen et al. | 271/227 |
| 4,984,281 | 1/1991 | Matsuhashi et al. | 382/7 |
| 5,054,092 | 10/1991 | LaCaze | 382/11 |
| 5,084,610 | 1/1992 | Markgraf et al. | 271/250 |
| 5,134,663 | 7/1992 | Kozlowski | 382/7 |
| 5,156,391 | 10/1992 | Roller | 271/250 |
| 5,164,748 | 11/1992 | Katayanagi et al. | 347/30 |
| 5,226,643 | 7/1993 | Kriegel et al. | 271/250 |
| 5,308,959 | 5/1994 | Cherry | 382/64 |

*Primary Examiner*—Jose L. Couso
*Assistant Examiner*—Anh Hong Do
*Attorney, Agent, or Firm*—Stephen C. Shear

[57] ABSTRACT

An apparatus for reading information off a document such as a check is herein disclosed. The apparatus includes an apparatus housing defining a specific path through which the document is intended to pass during normal operation of the apparatus. The apparatus also includes an arrangement including a read head positioned at a fixed point on the path and cooperating circuitry for reading specific information off of the document as the document is caused to move through the path and across the read head. And, the apparatus includes an arrangement for moving the document through the path and across the read head along with causing the document to engage against the read head as the document moves across the read head. This document moving arrangement includes an arrangement supporting a freely rotating idler roller which is positioned to engage the document against the read head. Also, this document moving arrangement is configured in a way which places a moment on the document as it moves through the path so as to insure that the document crosses the read head in a predetermined orientation with reset to the read head.

11 Claims, 4 Drawing Sheets

SELF ALIGNING, LOW POWER CHARACTER READING APPARATUS

BACKGROUND OF THE INVENTION

The present invention relates generally to a character reading apparatus and more specifically to an apparatus for reading a series of preprinted magnetic characters on a bank check while the check is being automatically moved through the apparatus.

In order to accurately read information off of a document such as a bank check with preprinted magnetic characters, you must move the characters past a magnetic read head in a predetermined way. This causes the read head to produce an electrical signal wave form which is used by a character recognition circuit to identify each character. Two prior art general approaches have been used to provide an apparatus which is intended to read magnetic characters off of a document.

The first approach attempts to hold the velocity of the document constant as the document moves past the read head and synchronizes its character recognition circuitry with the known velocity. As the wave form is generated the known velocity is used to divide the wave form into sections which correspond to each character. These character wave forms are then compared with stored, expected wave forms to identify each character. If for mine reason the velocity has varied, the wave forms may not match any of the expected wave forms and a particular character may not be recognized, or may be recognized incorrectly which is even worse than not recognizing it at all. To minimize this problem, typically a flywheel or other high inertial system to ensure constant velocity is used. While this is satisfactory for some applications, it requires larger more expensive drive motors, special gears, or other components which increase the costs. Also the electrical requirements are typically larger and the apparatus requires a more expensive regulated power supply. This also prevents these apparatus from being powered by a typical cash register input/output port.

In the second approach, the exact position of the check relative to time is monitored as the check moves past the read head. Therefore this approach is not concerned with variations in the speed of the check, at least to a limited extent. The information provided by monitoring the movement of the check is used to adjust the information provided by the electrical signal from the read head. This combination of information is then used to match the expected signal that would be generated if the speed had been a specific constant speed. A character recognition apparatus of this type must include an arrangement for measuring the speed of the check and an arrangement for storing and using this information to modify the information provided by the read head. These additional components again add to the expense of the apparatus. Also, the additional requirement of modifying the information from the read head requires a more powerful processing device adding still more to the costs and increasing the required processing time.

Another reason prior art character reading apparatus have power requirements larger than what is available through the typical cash register input/output port is that the document moving arrangement which they use creates a relatively large amount of friction prior to and as the document is moved through the apparatus. These frictional forces increase the load of the apparatus and therefore, the apparatus has a larger power requirement which is greater than what is available in a typical cash register input/output port.

In one typical arrangement, the drive wheel which moves the document through the apparatus is also used to engage the document against the read head. In order for this drive wheel to be able to grip the document in a way which will move the document through the apparatus, the drive wheel must exert a relatively large amount of pressure against the read head. This high pressure results in a large friction force as the drive wheel rubs against the read head prior to the document engaging the drive wheel. This large friction force causes a large initial load which requires a larger power source. Once the document engages the drive wheel, the load is reduced somewhat because the document slides more easily against the read head. However, since the frictional force is proportion to the pressure at which the document is pressed against the read head, the frictional force is still larger than it needs to be because the pressure required to grip the document is substantially greater than the minimum pressure required to engage the document against the read head.

In other prior art character reading apparatus, the drive wheel is not used to engage the document against the read head, but instead, a non-rotating torsion spring arm is positioned to hold the document against the read head as the document is moved through the apparatus. As the document moves between the read head and the non-rotating torsion arm, both the read head and the torsion arm exert a friction force in the form of drag on the document that adds to the power consumption of the overall apparatus. Therefore, the prior art apparatus using this arrangement are not able to be powered directly from a typical cash register input/output port, but instead, require an additional, more expensive power storage device which is charged by the cash register.

Another disadvantage with prior art character reading apparatus is that they typically rely on gravity to assist in the alignment of the document as it is moved through the apparatus. As mentioned above, it is critical that the characters be oriented in a predetermined way so that they move past the read head in a known orientation. Prior art character reading apparatus typically use gravity to hold the document against an edge guide thereby properly orienting the document. This approach has the disadvantage of restricting the mounting or positioning of the apparatus during its operation. For example, if an apparatus designed to be positioned horizontally is instead mounted vertically on a wall, the apparatus will not orient the check properly since gravity no longer forces the document into the proper position. In a this situation, or in any situation where there is not some method of automatically orienting the document in the proper way, the operator is required to carefully orient the document to insure the characters to be read move past the read head in the proper way.

As will be described in more detail hereinafter, a character reading apparatus designed in accordance with the present invention reduces or eliminates the problems described above by providing a low powered document moving arrangement and a self aligning feature.

SUMMARY OF THE INVENTION

As will be described in more detail hereinafter, an apparatus for reading information off of a document such as a bank check is disclosed herein. The apparatus includes an apparatus housing defining a specific path through which the document is intended to pass during normal operation of the apparatus. An arrangement is also provided including a read head positioned at a fixed point on the path defined by the housing. This arrangement also includes cooperating circuitry for reading specific information off of the document as the document is caused to move through the path and across the read head. The apparatus also includes means for moving the document through the specific path recited immediately above.

In accordance with one particular feature of the present invention, an arrangement is provided for causing the document to engage against the read head as the document moves across the read head. This arrangement includes means supporting a freely rotating idler roller which is positioned to engage the document against the read head as the document moves across the read head while at the same time rotating freely in order to minimize friction between the document and the roller. As a result of this arrangement, friction is reduced and this arrangement has a low power consumption. This low power capability allows the apparatus to be powered directly by a typical cash register input/output port without requiring any additional more costly energy storage devices.

In accordance with another particular feature of the present invention, the document moving arrangement includes a document self aligning feature. Specifically, the document moving arrangement is configured in a way which places an angular moment on the document as it moves through the path. This moment forces the document against an edge guide provided by the apparatus housing so as to insure that the document crosses the read head in a predetermined orientation with respect to the read head. This makes it easy for the operator to insert the document properly into the overall apparatus. Moreover, this self aligning feature does not rely on gravity to assist in the alignment of the document and therefore allows the apparatus to be placed in a variety of positions such as vertically, horizontally, or at an angle without diminishing its performance.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
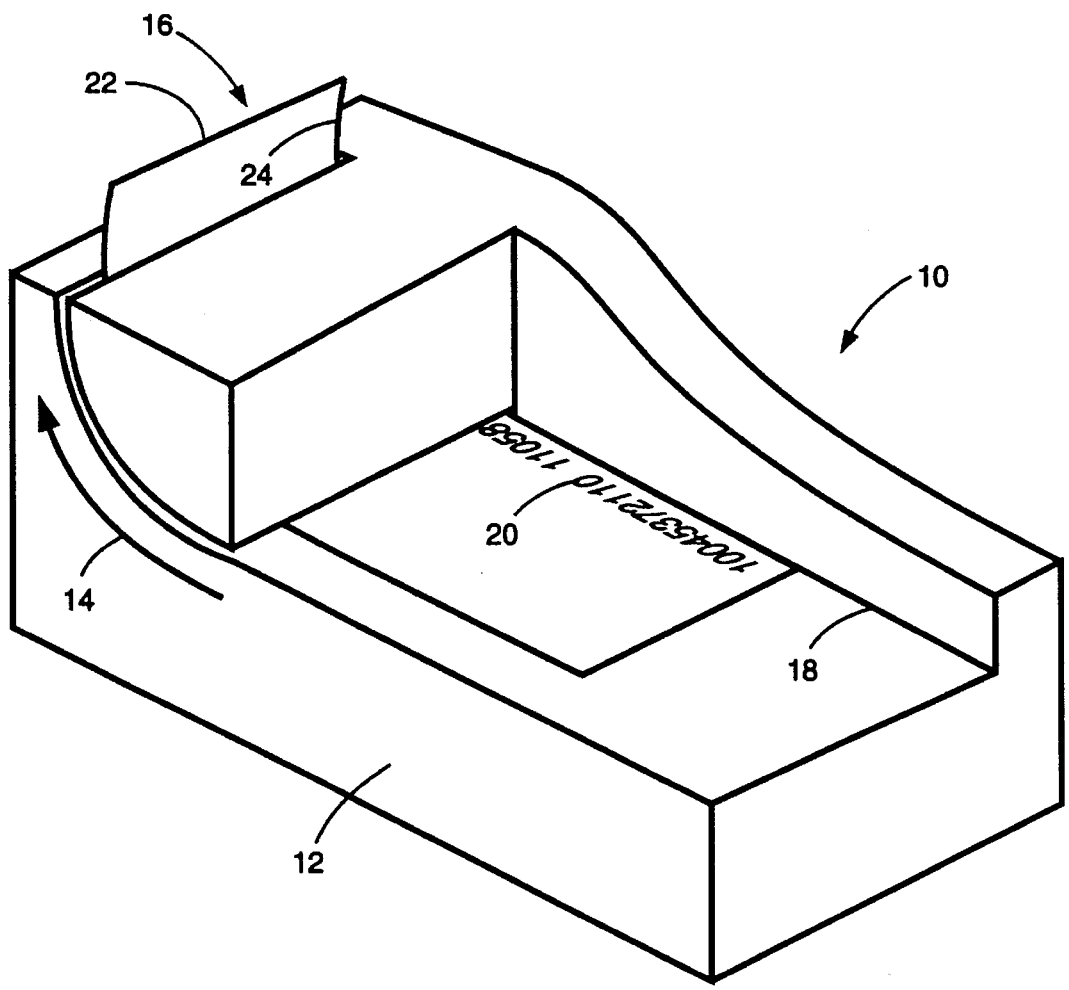
FIG. 1 is a diagrammatic perspective view of a check reading apparatus designed in accordance with the present invention and specifically showing the path through which a check is caused to move.

Turning to the drawings, wherein like components are designated by like reference numerals throughout the various figures, attention is initially directed to FIG. 1. This figure illustrates a check reading apparatus designed in accordance with the present invention and generally designated by reference numeral 10. Check reading apparatus 10 includes a housing 12 which defines a specific path 14 through which a check 16 is intended to pass during normal operation of check reading apparatus 10. Housing 12 also includes an edge guide 18 which defines the inside edge of path 14. Check 16 includes preprinted magnetic characters 20, a leading edge 22, and a bottom edge 24. In order for apparatus 10 to read characters 20 on check 16 properly, the operator must insert leading edge 22 of check 16 into apparatus 10 with the check facing up and bottom edge 24 of check 16 adjacent to and parallel with edge guide 18. As will be described in more detail hereinafter, once check 16 is fully inserted into apparatus 10, a document moving arrangement automatically moves check 16 against edge guide 18 if it is not already in that position and holds the check against the edge guide as the check is moved through path 14. This places magnetic characters 20 in the proper position and proper orientation to be read by apparatus 10.

As will be described in more detail immediately hereafter, one feature of apparatus 10 is its ability to be powered directly from the low voltage available through a typical cash register input/output port without requiring any energy storage device or ancillary power. This feature of the present invention is made possible by providing a low friction document moving arrangement. Another feature of apparatus 10 is its ability to properly align the check as it moves through its path, regardless of the orientation of the apparatus. This feature is made possible by applying a particular arrangement of forces and different velocities on the check as it moves through its path.

Figure 2A:
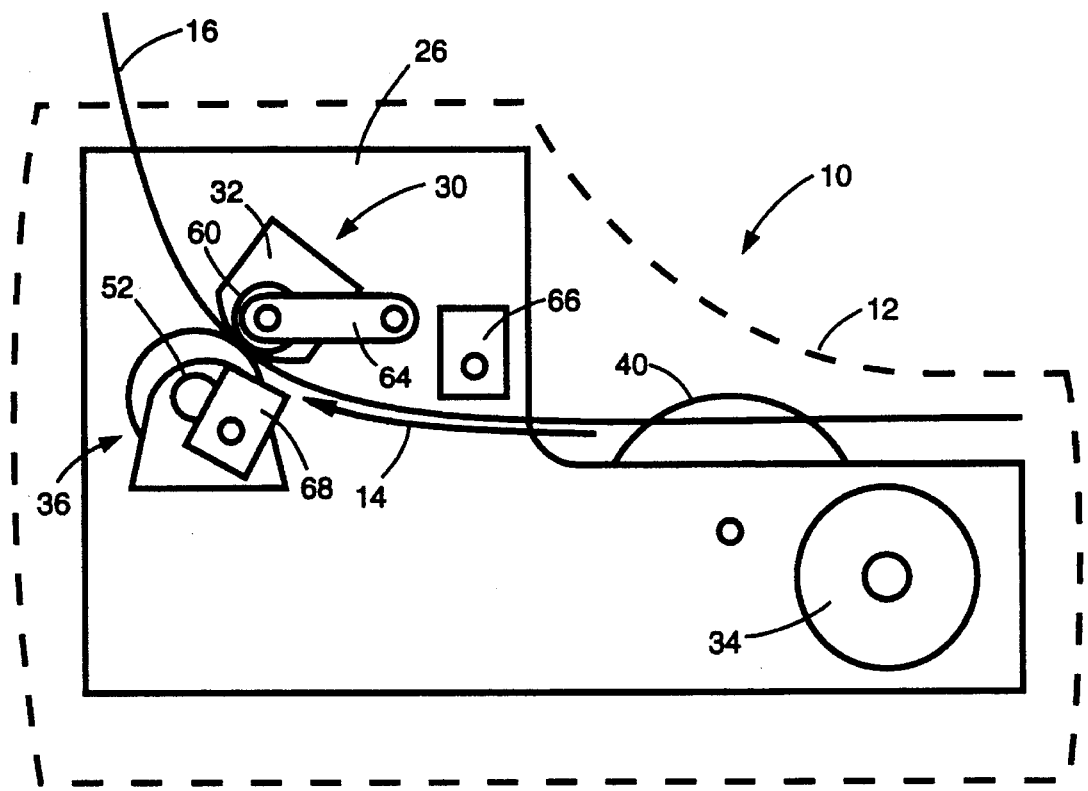
FIG. 2A is a diagrammatic side view illustrating the internal components of the apparatus shown in FIG. 1.
Figure 3:
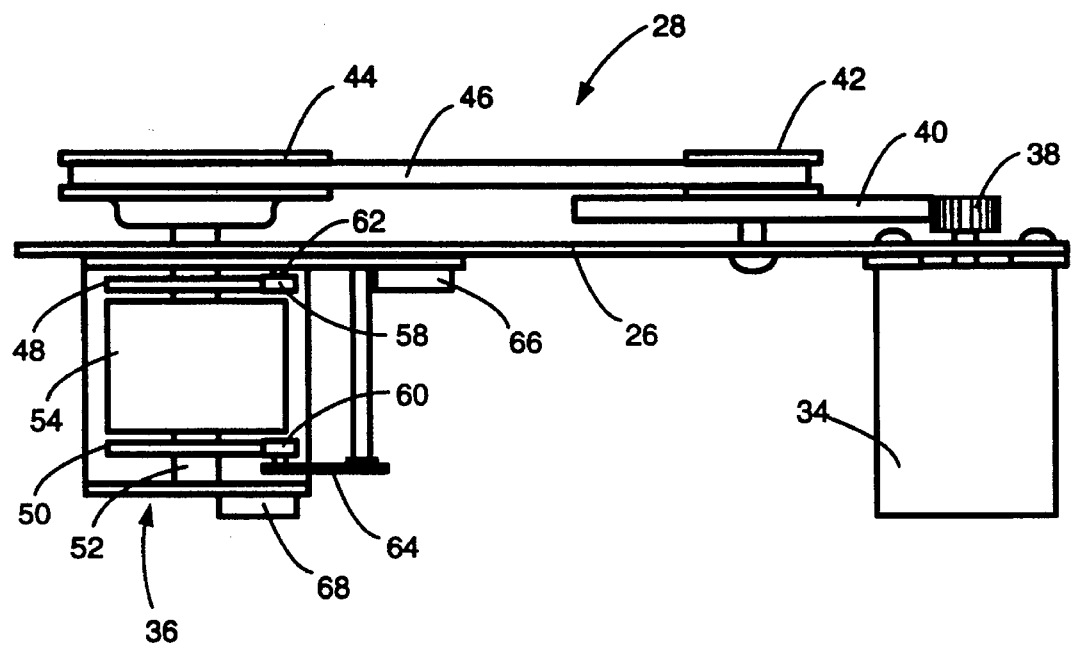
FIG. 3 is a diagrammatic top view of the document moving arrangement shown in FIG. 2A.

Referring now to FIGS. 2A and 3, overall apparatus 10 is shown including housing 12 which supports a mounting plate 26 which in turn supports a low friction arrangement 28 for automatically aligning and moving check 16 through path 14. Mounting plate 26 also supports a suitable and readily available arrangement 30 for reading characters off of the document as it is caused to move through path 14. Character reading arrangement 30 includes a magnetic read head 32 positioned adjacent to a fixed point on path 14. Character reading arrangement 30 also includes suitable cooperating circuitry for recognizing the magnetic characters printed on check 16 as it is caused to move through path 14 and across read head 32. One example of character reading arrangement 30 is described in copending United States patent application Ser. No. 08/201,761 (attorney docket SOR1P001) entitled "Character Reading Apparatus" and filed cotemperaniously herewith, which application is incorporated herein by reference.

Referring now to FIG. 3 which illustrates a top view of document moving arrangement 28, this arrangement is shown including a suitable and readily available electric drive motor 34. Drive motor 34 is operatively connected to a drive roller assembly 36 by gears 38 and 40, pulleys 42 and 44, and a drive belt 46. Gear 38 is fixed to the shaft of drive motor 34 and drives gear 40. Pulley 42 is fixed to the same axis as and rotates with gear 40 as well as drives pulley 44 by means of drive belt 46. Pulley 44 is fixed to drive axle 52 (to be described below) in order to drive roller assembly 36 and causes it to rotate when drive motor 34 is turned on. It should be understood that the above described components that operatively connect drive motor 34 to drive roller assembly 36 represent one preferred embodiment of the present invention. The components making up this connection may vary widely while remaining within the scope of the present invention so long as they properly couple motor 34 to drive roller assembly 36.

Figure 2B:
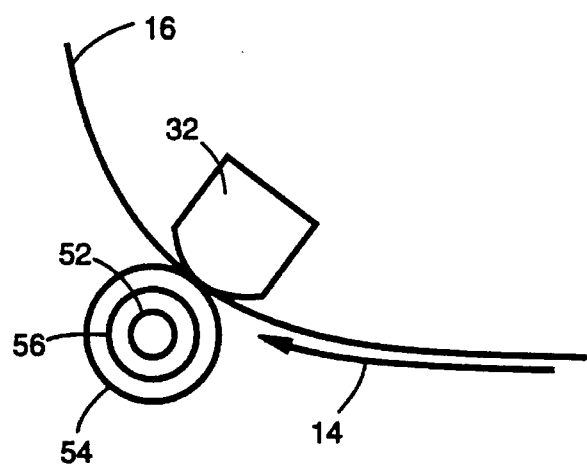
FIG. 2B is a diagrammatic cross sectional detail view showing the idler roller engaging the check against the read head.
Figure 4:
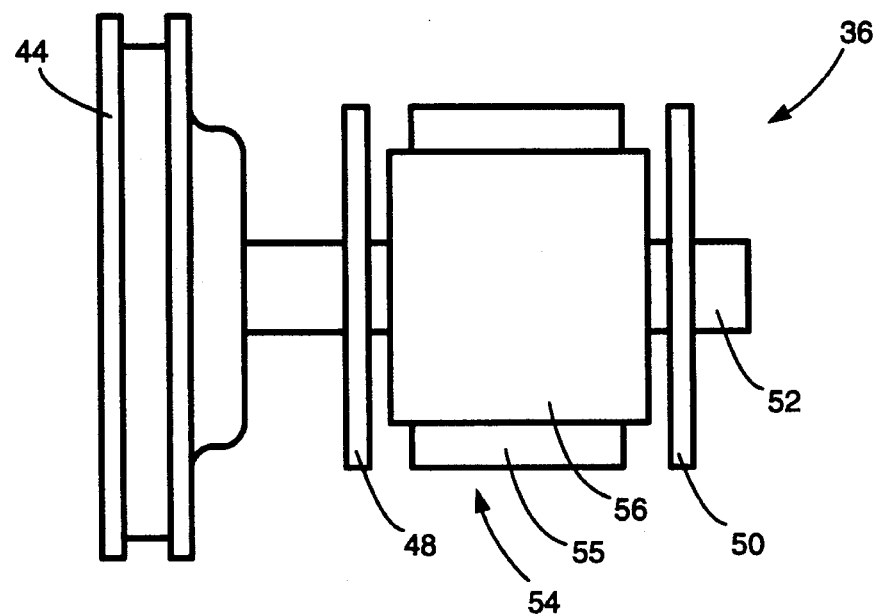
FIG. 4 is a diagrammatic view of the drive roller assembly shown in FIG. 3.

Referring now to FIG. 4, drive roller assembly 36 is shown including an inner gripping drive wheel 48 (closer to edge guide 18) and an outer gripping drive wheel 50 (further from edge guide 18) which are fixed to a drive axle 52 and made from a firm, high traction material such as medium density urethane. Inner grip wheel 48 has a slightly larger diameter than outer grip wheel 50. As will be described in more detail hereinafter, this difference in diameter assists in the self aliening feature mentioned above. Drive axle 52 also supports a freely rotating idler roller 54 having an outer segment 55 made from a softer material such as a cellular foam or a micro cellular urethane supported on a low friction hub 56 such as a Delron hub. This idler roller is positioned between gripping wheels 48 and 50. As best shown in FIG. 2B, idler roller 54 is positioned to engage check 16 against read head 32 as check 16 moves through path 14 and across read head 32 while at the same time rotating freely in order to minimize friction between check 16 and roller 54.

Referring back to FIG. 3, each of the gripping drive wheels 48 and 50 is paired with a respective adjacent idler wheel 58 and 60. These idler wheels 58 and 60 are freely rotating wheels positioned so as to form pairs of confronting document grip wheels with their respective gripping drive wheels 48 and 50. These pairs of grip wheels 48/58 and 50/60 are positioned on opposite sides of and do not engage read head 32 and therefore avoid friction with the read head. For reasons related to the self aligning feature to be described, idler wheel 58 is supported by an axis 62 which is fixed to mounting plate 26 while idler wheel 60 is supported on a spring loaded torsion arm 64, which is suitably attached to mounting plate 26.

Referring again to FIG. 2A, when check 16 is inserted into apparatus 10, a leading edge sensor 66 and a side edge sensor 68 which are provided as part of document moving arrangement 28 are positioned to detect the presence of check 16 and consequently switch on motor 34. In the presently preferred embodiment, these sensors are optical sensors mounted at the outer end of drive roller assembly 36 and on mounting plate 26 respectively. However, other embodiments may incorporate other types of sensors such as but not limited to mechanical switches. Once the motor is switched on, the operator further inserts check 16 until it engages and is gripped by grip wheels 48/58 and 50/60. During this movement of the check but before it reaches read head 32, idler roller 54 does not move and therefore does not add any load to motor 34. At this point, the two pairs of confronting grip wheels 48/58 and 50/60 grip the check and move it through the path. As check 16 is moved further through path 14, idler roller 54 engages check 16 against read head 32, which reads the characters printed on check 16 using character reading arrangement 30. Because idler roller 54 is made of a relatively soft material, as mentioned above, and because it is not used to move check 16 but rather rotates freely, the pressure against read head 32 exerted by idler roller 54 is limited to the minimum pressure needed to hold check 16 against read head 32. Therefore the friction between check 16 and read head 32 and between check 16 and idler roller 54 is minimized. Also, since drive grip wheels 48 and 50 do not press against read head 32 but rather grip check 16 by opposing freely rotating wheels 58 and 60, friction is again minimized. The combination of these methods of reducing the friction produced as check 16 moves through path 14 reduces the power required to operate apparatus 10. As mentioned above, this low power capability allows the apparatus to be powered directly from a typical cash register input/output port.

As will be described in more detail immediately hereafter, another feature of the present invention is the ability of the apparatus to self align the check without gravity assistance. This allows the check reading apparatus to be mounted or positioned in a variety of ways including mounting vertically on a wall, placed horizontally on a work surface, or positioned at some other angle without diminishing the performance of the apparatus. This feature also relaxes the requirements for the operator of the apparatus by accepting and properly processing checks which are placed into the apparatus in positions that are not initially fully and properly aligned with the apparatus.

Figure 5:
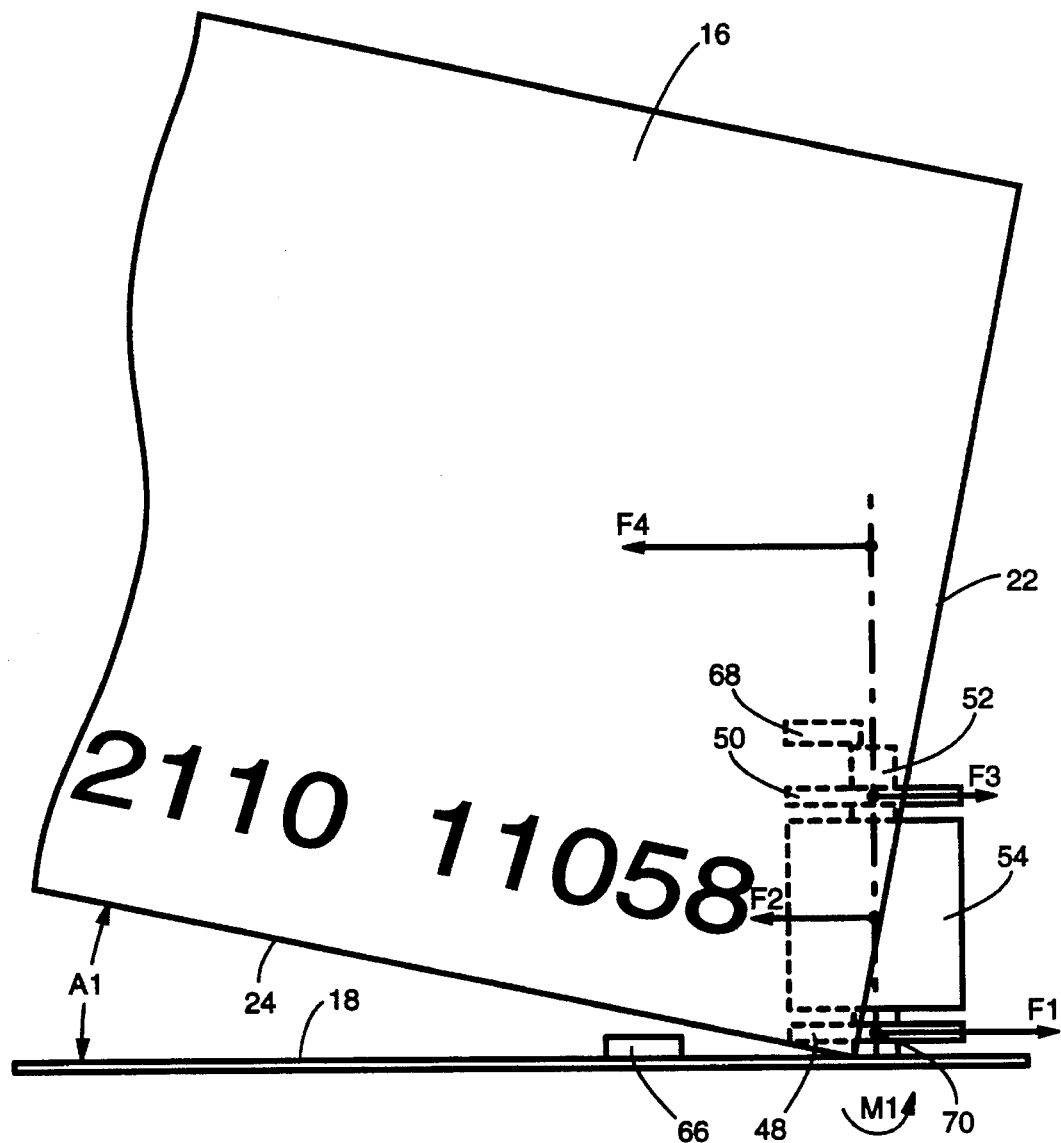
FIG. 5 is a force diagram showing the forces associated with the drive roller assembly which cause the document to rotate into its predetermined position, also shown are the positions of the sensors which determine when the check is in an acceptable position and switch on the document moving arrangement.

As indicated previously, check 16 is properly oriented as it moves through path 14 when its bottom edge 24 rests against and moves along edge guide 18. As shown in FIG. 5, the self aligning feature insures that check 16 is properly oriented as it moves through path 14. Three separate elements contribute to this self aligning feature. First, sensors 66 and 68 are positioned in a way which turns on the drive motor when check 16 is placed into the apparatus so that the leading edge 22 of check 16 activates sensor 68 and the bottom edge 24 of check 16 activates sensor 66. This geometry of the sensors with respect to edge guide 18 requires that check 16 be positioned within a certain tolerance angle A1 of edge guide 18 before sensors 66 and 68 will be activated and therefore turn on the drive motor. Secondly, as will be described in more detail hereinafter, the document moving arrangement described in the above paragraphs is configured in a way which places a specific angular moment on the document as it moves through the apparatus. This moment forces check 16 against an edge guide 18, which is part of housing 12, so as to insure that the document crosses the read head in the desired orientation with respect to the read head. And thirdly, as was mentioned above, inner gripping drive wheel 48 has a slightly larger diameter than outer gripping drive wheel 50. This variation in diameter tends to also move check 16 against edge guide 18 further insuring that the document crosses the read head in a predetermined orientation with respect to the read head.

FIG. 5 also illustrates the forces exerted on check 16 as it is moved from left to right by the apparatus and more particularly by drive wheels 48 and 50. This force diagram represents the forces on check 16 around a point 70 which is the point at which gripping drive wheel 48 contacts check 16. The force F1 corresponds to the force exerted on the check by grip wheel 48. This force is proportional to the pressure exerted between confronting gripping drive wheel 48 and idler wheel 58. Force F1 is relatively large because the axis of idler wheel 58 is mounted to mounting plate 26 as previously described, such that it always exerts a relatively large pressure on gripping drive wheel 48. Force F2 corresponds to the friction drag force exerted on check 16 by the read head as check 16 is caused to move past the read head. Since this force is proportional to the pressure exerted by check 16 against the read head by idler roller 54, it is relatively small because, as mentioned above, the pressure exerted by idler roller 54 on check 16 is limited to the minimum pressure needed to hold check 16 against the read head. Force F3 corresponds to the force exerted on check 16 by gripping wheel 50 and is proportional to the pressure between wheel 50 and its confronting idle wheel 60. This force is caused to be less than force F1 because idler wheel 60, as described above, is mounted on spring loaded torsion bar 64 which exerts a lesser pressure on gripping drive wheel 50 than idler wheel 58 exerts on gripping drive wheel 48 because idler wheel 58 has a fixed axis. And finally, force F4 corresponds to the frictional drag force exerted on check 16 by housing 12 as check 16 is caused to move through path 14. This force is a relatively large force compared to force F3 and is mainly due to the fact that check 16 is moved through an arched path which increases the friction on check 16 because of the spring of check 16.

The net result of forces F1, F2, F3, and F4 is a moment M1 around point 70 which rotates check 16 in a counter clockwise direction (as viewed in FIG. 5) until bottom edge 24 of check 16 engages the edge guide. Once check 16 is rotated up against edge guide 18, moment M1 holds check 16 against edge guide 18 as check 16 is moved through the apparatus. This moment is large enough to hold check 16 against edge guide 18 regardless of the orientation of apparatus 10. In other words, this moment will hold check 16 in its proper orientation as it moves through the apparatus even if the apparatus is mounted vertically, sideways, or at any other angle.

Although only one embodiment of the present invention has been described, it should be understood that the present invention may be embodied in many other specific forms without departing from the spirit or scope of the invention. Particularly, the present invention would apply to an apparatus for reading character off of any type of document and is not limited to an apparatus for reading bank checks. Also, although a magnetic character reading apparatus was described, the present invention is not limited such an apparatus but would apply to other methods of reading characters such as an optical character reading apparatus.

Therefore, the present examples are to be considered as illustrative and not restrictive, and the invention is not to be limited to the details given herein, but may be modified within the scope of the appended claims.

What is claimed is:

1. An apparatus for reading preprinted characters printed on a document such as a check, comprising:
    (a) an apparatus housing defining a specific path through which said document is intended to pass during normal operation of said apparatus;
    (b) means including a read head positioned at a fixed point on said path and cooperating circuitry for reading said characters printed on said document as the document is caused to move through said path and across said read head, said read head having a document engaging surface; and
    (c) a moving arrangement for moving said document through said specific path and across said read head in a way which places a moment on said document as the document moves through said specific path, said moment causing said document to automatically rotate into a predetermined orientation such that said preprinted characters on the document are moved past said read head at a predetermined orientation, said moving arrangement including;
        (i) a drive axle, said drive axle's axis being substantially parallel to the document engaging surface of said read head and perpendicular to the intended movement of said document as the document crosses said read head,
        (ii) a first pair of confronting document grip wheels located within said specific path and through which said document must pass as the document moves through said specific path, said first pair of confronting grip wheels having a first gripping drive wheel mounted for rotation to said drive axle adjacent to but out of engagement with said read head and a first gripping idler wheel supported for free rotation in confronting relationship to said first gripping drive wheel,
        (iii) a second pair of confronting document grip wheels located within said specific path and through which said document must pass as the document moves through said specific path, said second pair of confronting document grip wheels having a second gripping drive wheel mounted for rotation to said drive axle adjacent to but out of engagement with said read head and a second gripping idler wheel supported for free rotation in confronting relationship to said second gripping drive wheel and
        (iv) means for causing said drive axle and therefore said first and second gripping drive wheels to rotate in a way which moves said document along said specific path as the document passes through and is gripped by the confronting document grip wheels.

2. An apparatus according to claim 1 wherein said drive axle further supports coaxially with said first and second griping drive wheels a freely rotating idler roller which is positioned in confronting relationship with said read head so as to engage said document against said read head as the document moves across the read head while at the same time rotating freely in order to minimize friction between the document and the roller the first and second gripping drive wheels of said pairs of confronting document grip wheels being located adjacent to and coaxial with said idler roller but out of engagement with said read head.

3. An apparatus according to claim 1 wherein said first gripping drive wheel of said first pair of confronting document grip wheels and said second gripping drive wheel of said second pair of confronting document grip wheels have diameters that are different from one another whereby to contribute to said moment force placed on said document.

4. An apparatus according to claim 3 wherein said apparatus housing includes an edge guide extending along and defining one side of at least a portion of said specific path and wherein the diameters of said gripping drive wheels of said pairs of confronting document grip wheels are such that as said document moves simultaneously through both of said pairs of confronting document grip wheels, the confronting document grip wheels place a moment force on the document in a way which causes the back end of the document to rotate toward said edge guide if it is not already against the edge guide, whereby to cause the document to move along said specific path parallel with said edge guide.

5. An apparatus according to claim 2 wherein each of said gripping drive wheel constructed of a material that is harder than the material making up said freely rotating idler roller.

6. An apparatus according to claim 1 wherein said specific path through which said document is intended to pass is a curved path which cooperates with said moving arrangement in a way which contributes to said moment force placed on the document as it moves through said specific path such that the document crosses said read head at a predetermined orientation with respect to the documents path of movement.

7. A document handling arrangement for use in an apparatus for reading preprinted characters printed on a document such as a check including a housing defining a specific path through which said document is intended to pass during normal operation of the apparatus and means including a read head and cooperating circuitry for reading said characters printed on said document as the document is caused to move through said path and across said read head, said document handling arrangement comprising a moving arrangement for moving said document through said specific path and across said read head in a way which places a moment on said document as the document moves through said specific path, said moment causing said document to automatically rotate into a predetermined orientation such that said preprinted characters on the document are moved past said read head at a predetermined orientation, said moving arrangement including:

(a) a drive axle, said drive axle's axis being substantially parallel to the document engaging surface of said read head and perpendicular to the intended movement of said document as the document crosses said read head;

(b) a first pair of confronting document grip wheels located within said specific path and through which said document must pass as the document moves through said specific path, said first pair of confronting grip wheels having a first gripping drive wheel mounted for rotation to said drive axle adjacent to but out of engagement with said read head and a first gripping idler wheel supported for free rotation in confronting relationship to said first gripping drive wheel;

(c) a second pair of confronting document grip wheels located within said specific path and through which said document must pass as the document moves through said specific path, said second pair of confronting document grip wheels having a second gripping drive wheel mounted for rotation to said drive axle adjacent to but out of engagement with said read head and a second gripping idler wheel supported for free rotation in confronting relationship to said second gripping drive wheel; and (d) means for causing said drive axle and therefore said first and second gripping drive wheels to rotate in a way which moves said document along said specific path as the document passes through and is gripped by the confronting document grip wheels.

8. A document handling arrangement according to claim 7 wherein said drive axle further supports coaxially with said first and second gripping drive wheels a freely rotating idler roller which is positioned in confronting relationship with said read head so as to engage said document against said read head as the document moves across the read head while at the same time rotating freely in order to minimize friction between the document and the roller the fast and second gripping drive wheels of said pairs of confronting document grip wheels being located adjacent to and coaxial with said idler roller but out of engagement with said read head.

9. A document handling arrangement according to claim 7 wherein said first gripping drive wheel of said first pair of confronting document grip wheels and said second gripping drive wheel of said second pair of confronting document grip wheels have diameters that are different from one another whereby to contribute to said moment force placed on said document.

10. An apparatus according to claim 9 wherein said apparatus housing includes an edge guide extending along and defining one side of at least a portion of said specific path and wherein the diameters of said gripping drive wheels of said pairs of confronting document grip wheels are such that as said document moves simultaneously through both of said pairs of confronting document grip wheels, the confronting document grip wheels place a moment force on the document in a way which causes the back end of the document to rotate toward said edge guide if it is not already against the edge guide, whereby to cause the document to move along said specific path parallel with said edge guide.

11. An apparatus according to claim 8 wherein each of said gripping drive wheels is constructed of a material that is harder than the material making up said freely rotating idler roller.

* * * * *